UNITED STATES PATENT OFFICE.

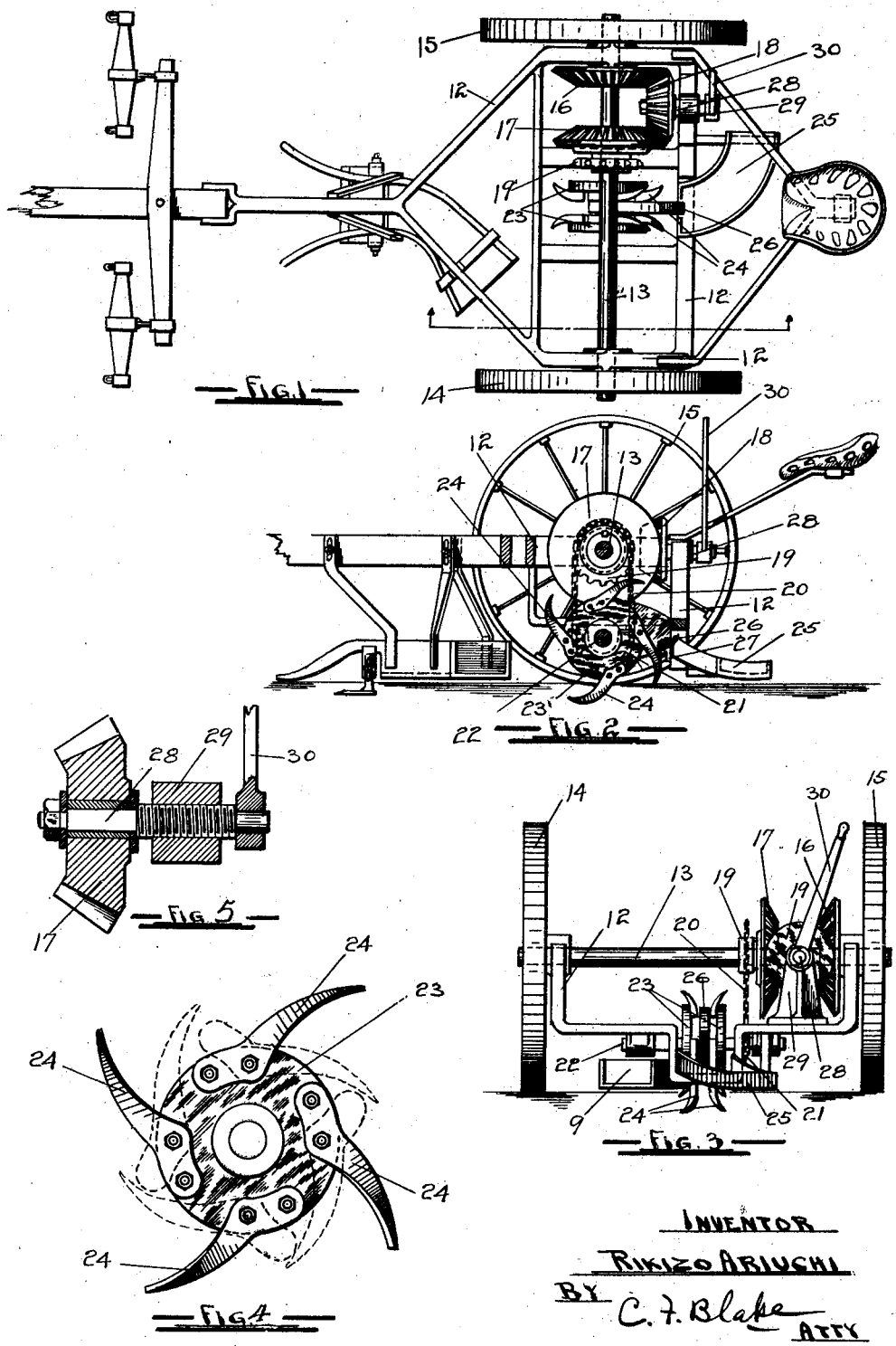

RIKIZO ARIUCHI, OF KERRY, OREGON.

HARVESTER.

1,369,373.  Specification of Letters Patent.  Patented Feb. 22, 1921.

Application filed September 24, 1919. Serial No. 326,079.

*To all whom it may concern:*

Be it known that I, RIKIZO ARIUCHI, a subject of the Emperor of Japan, residing at Kerry, Clatsop county, State of Oregon, have invented certain new and useful Improvements in Harvesters, of which the following is a specification.

My invention relates to harvesters in general, and particularly to devices of such character used for harvesting beets and the like.

The object of my invention is to provide a device that will dig the beets, as the device is propelled along the row of beets.

I accomplish the above object by means of the construction illustrated in the accompanying drawing which is a part of this application for Letters Patent, like characters of reference indicating like parts throughout the several views thereof, and in which:

Figure 1 is a plan view of my device.

Fig. 2 is a sectional elevation upon line 2—2 of Fig. 1.

Fig. 3 is a rear elevation, the seat being removed.

Fig. 4 is a detail side elevation of the diggers.

Fig. 5 is a sectional detail of the driving pinion.

In general my device consists of a frame mounted upon wheels, and a rotary digging device suspended therefrom.

The frame 12 is mounted upon a rotary axle 13 upon which axle wheels are mounted, wheel 14 being free and wheel 15 being fixed thereon. Adjacent to wheel 15 are a pair of bevel gears 16 and 17 connected by a pinion 18 meshing with each gear, as shown in Fig. 1, bevel gear 16 being secured to the axle 13 and bevel gear 17 being free thereon. Secured to the hub of bevel gear 17 is a chain sprocket 19 connected by chain 20 to a similar sprocket 21 upon a shaft 22 journaled in the lower portion of frame 12 substantially beneath and parallel to shaft 13.

Secured upon shaft 22 are a pair of flanges 23 spaced apart a short distance symmetrically to the longitudinal axis of the device, as shown in Figs. 1 and 3. Secured upon each of said flanges 23 are a plurality of curved digger arms 24, said arms being curved in the direction of motion of the flanges 23, and also the arms 24 upon one flange 23 being curved away from those upon the opposite flange 23, as shown in Figs. 1 and 3.

In operating, said digger arms 24 project beneath the surface of the ground sufficiently to grasp the beets between them and raise them out of the ground.

The arms 24 may be rotated upon their respective flanges 23 to raise them above the surface of the ground when the device is being transported from place to place, as illustrated in detail by dotted lines in Fig. 5.

The beets are deposited in a trough 25 secured to the frame 12 and projecting rearwardly and to one side, as shown in Fig. 1, thus depositing the beets upon the ground to one side of the row.

To remove the dug beets from the arms 24 I provide a cam 26 mounted upon shaft 22 between the flanges 23 and secured against rotation by attachment to frame 12 by a clip 27. This cam is of such a shape as to gradually release the beets from the grasp of the arms 24 as the latter rotate, and to deposit the released beets within trough 25.

To control the motion of the digger arms 24 I mount the bevel pinion 18 rotatably upon a shaft 28, which shaft is threaded into a bracket 29, and provided with a hand lever 30 secured thereto, whereby said shaft 28 may be manually rotated in bracket 29, thus by means of the screw thread therein removing the pinion 18 from meshing with the bevel gears 16 and 17, or placing said pinion into mesh therewith, as desired.

My device may be made of any size and constructed of any materials deemed convenient and suitable for a device of this character, and while I have illustrated and described a form of construction and arrangement of parts found desirable in materializing my invention, I wish to include in this application for Letters Patent all mechanical equivalents and substitutes that may fairly be considered to come within the scope and purview of my invention as defined in the appended claim.

Having disclosed my invention so that others may be enabled to construct and to use the same, what I claim as new and desire to secure by Letters Patent is:

In a harvester for beets and the like, a pair of flanges spaced apart transversely of the device; a plurality of pairs of forwardly curved digger arms, one of each pair of said arms being secured upon each of said flanges, the corresponding arms of each pair being relatively outwardly curved; a cam between said flanges and said arms of each pair adapted to gradually release the beets from the grasp of each pair of arms successively; and means to rotate said flanges and said arms.

In witness whereof I claim the foregoing as my own I hereunto affix my signature in the presence of two witnesses at Portland, county of Multnomah, State of Oregon, this 6" day of Sept., 1919.

RIKIZO ARIUCHI.

Witnesses:
C. F. BLAKE,
L. J. ROBINSON.